(12) United States Patent
Lantos et al.

(10) Patent No.: US 9,162,525 B2
(45) Date of Patent: Oct. 20, 2015

(54) WHEEL HUB ARRANGEMENT FOR A WHEEL DRIVE BY AN ALTERNATING SYMMETRIC DRIVE SYSTEM USING A FLEXIBLE PULLING ELEMENT, THAT CAN BE USED IN VEHICLES PARTICULARLY IN BICYCLES

(75) Inventors: Mihaly Lantos, Budapest (HU); Robert Kohlheb, Budapest (HU)

(73) Assignee: STRINGDRIVE TECHNOLOGIES KFT., Szolnok (HU)

( * ) Notice: Subject to any disclaimer, the term of this patent is extended or adjusted under 35 U.S.C. 154(b) by 438 days.

(21) Appl. No.: 13/806,782

(22) PCT Filed: Jun. 28, 2011

(86) PCT No.: PCT/HU2011/000059
§ 371 (c)(1),
(2), (4) Date: Mar. 4, 2013

(87) PCT Pub. No.: WO2012/001436
PCT Pub. Date: Jan. 5, 2012

(65) Prior Publication Data
US 2013/0200684 A1 Aug. 8, 2013

(30) Foreign Application Priority Data

Jun. 29, 2010 (HU) ..................................... 1000344

(51) Int. Cl.
*B60B 27/00* (2006.01)
*B62M 1/28* (2013.01)
*B62M 25/06* (2006.01)
*B62M 9/00* (2006.01)
*F16D 41/30* (2006.01)

(52) U.S. Cl.
CPC .............. *B60B 27/0005* (2013.01); *B62M 1/28* (2013.01); *B62M 9/00* (2013.01); *B62M 25/06* (2013.01); *F16D 41/30* (2013.01)

(58) Field of Classification Search
CPC ....... B60B 27/0005; B62M 1/28; B62M 1/32; B62M 25/06; B62M 9/00; F16D 41/30
See application file for complete search history.

(56) References Cited

U.S. PATENT DOCUMENTS

| 2,185,698 A * | 1/1940 | Wright ........................... 280/251 |
| 3,039,790 A * | 6/1962 | Trott .............................. 280/251 |
| 4,379,566 A * | 4/1983 | Titcomb ......................... 280/251 |

(Continued)

FOREIGN PATENT DOCUMENTS

| DE | 43 19 104 A1 | 12/1994 |
| DE | 10 2005 017212 A1 | 10/2006 |
| WO | 2009/065057 A2 | 5/2009 |

OTHER PUBLICATIONS

International search report dated Sep. 27, 2011, issued in International Application No. PCT/HU2011/000059.

*Primary Examiner* — Kip T Kotter
(74) *Attorney, Agent, or Firm* — Handal & Morofsky LLC

(57) ABSTRACT

Wheel hub arrangement with three drum units comprising a hollow drum (18), a winding of a flexible pulling element fixed on the drum, and a biasing spring (22) in the hollow inner space. Respective free-wheels (36) are provided at sides of the hub unit (4). The wheel hub unit comprises a pair of spaced driving sleeves (33) arranged in axial direction and the sides of the driving sleeves facing to a drum unit and being connected therewith to transmit of torque only. The driving sleeves are surrounded by intermediate sleeves (38) and a spacing is formed between them, wherein a ball bearing (35) and one of the freewheels are arranged so that they are connected both with the outer surface of the driving sleeve and the inner surface of the intermediate sleeve. The intermediate sleeves are connected rigidly together and they are also connected at least during the driving sessions to an outer sleeve (40) of the wheel hub unit.

10 Claims, 7 Drawing Sheets

(56) References Cited

U.S. PATENT DOCUMENTS

| | | | | |
|---|---|---|---|---|
| 4,574,649 A | * | 3/1986 | Seol | 74/138 |
| 5,833,257 A | * | 11/1998 | Kohlheb et al. | 280/251 |
| 6,298,740 B1 | * | 10/2001 | Bridges | 74/120 |
| 8,602,433 B2 | * | 12/2013 | Kohlheb et al. | 280/251 |

* cited by examiner

WHEEL HUB ARRANGEMENT FOR A WHEEL DRIVE BY AN ALTERNATING SYMMETRIC DRIVE SYSTEM USING A FLEXIBLE PULLING ELEMENT, THAT CAN BE USED IN VEHICLES PARTICULARLY IN BICYCLES

The invention relates to a wheel hub arrangement for a wheel driven by an alternating symmetric drive system using a flexible pulling element such as a rope, the arrangement can be used in vehicles, particularly in bicycles, and the wheel hub arrangement is connected in a releasable way to frame parts of the vehicle that hold the wheel. This wheel hub arrangement comprises a first drum unit, a wheel hub unit and a second drum unit, which units are arranged axially side-by-side along a common wheel axis and define a central axial bore; it further comprises a fixing shaft lead through a central bore of these units and it is connected to associated frame parts in a releasable manner. The drum units each comprise: a hollow drum having an outer surface, a winding of the flexible pulling element fixed to the hollow drum, and during the alternating driving operation the flexible pulling element is alternately wound up and down to and from the winding. The wheel hub unit comprises an outer sleeve pivoted for rotation around the wheel axis, the outer sleeve comprises connection parts that can be connected to elements (e.g. sprockets) supporting and holding the wheel. Furthermore, the wheel hub arrangement comprises respective freewheels at each side, and when the drums are rotated in the direction of driving, the freewheels allow rotation of the outer sleeve together with that one of the two drums which has momentary the highest angular speed, whereas the freewheels allow the wheel to freely rotate in forward direction when the angular speed of the wheel is higher than the angular speed of any of the drums.

An alternating symmetric drive and a bicycle driven thereby that have the described properties is published in U.S. Pat. No. 5,833,257, wherein respective swinging arms are moved by the pedals and crank arms of the bicycle in opposite phases arranged at respective sides of the bicycle. At the two sides of the hub of the rear wheel respective drums are provided which are rotated in forward direction when the swinging arm moves in forward direction by means of a solid or flexible pulling element. In the rearward moving section of the alternating motion respective pulling elements force the swinging arm and the drums to take an opposite movement. The cited patent describes several ways how the pulling element can be designed, however, of these solution reference will be made to the one shown in FIG. 7 of that patent together with the associated design of the rear hub. Here in the inner sides of the drums that are arranged close to the hub a respective second drum is provided, and a coil spring used for pulling back of the swinging elements is arranged in the interior of the second drum. Directly beside the drum that constitutes a hosing for the coil spring and rigidly connected therewith in each side a respective freewheel is arranged. One ring of the freewheel is connected to the outer sleeve of the wheel hub, which is connected by ball bearings to a central stationary shaft.

Such a design is connected with a number of problems. One of them is the inefficient utilization of the axial space, as a result of which the axial size has been too large, since in both sides place had to be provided to the rope drum, beside it to the housing of the coil spring and to the ring of the freewheel. This size was further increased by the required width of the tires and the central width of the sprocket basket, which cannot be decreased below a predetermined size to ensure sufficient rigidity for the wheel. This is a reasonable condition, since the inner ends of the sprockets are fixed at the side rims of the wheel hub, and the axial distance between the rims determine the rigidity of the wheel held by the sprockets.

A further problem with the described design was that normal freewheels are very sensitive to the correct angular position of their axes otherwise they tend to get locked. The pulling forces exercised in normal direction to the axis by the pulling rope when being wound up the rope drum have tried to bend the central shaft of the hub, and the associated bending moment has loaded the freewheels in a direction normal to their movement. Because of these effects one had to use larger elements designed to such excess load, and the weight, size and costs of such elements was too high.

A further drawback lied in that one could remove the rear wheel only by releasing the pulling element. In the described embodiments the two opposite surfaces on the rear fork of the bicycle where the arrangement was fixed, had to be accurately parallel with each other otherwise any error in the angular position could lead to increased friction or even locking of the ball bearings.

A further property of the described drive lied in that the use of a pair of freewheels allowed rotation of the rear wheel in forward direction only. Although bicycles can be driven only in forward direction, in different situation one has to carry out certain maneuvers, wherein the possibility of moving the bike backwards is inevitable. Without solving this problem, a bicycle cannot be used in normal commerce.

The object of the present invention is to provide a wheel hub arrangement for a wheel moved by an alternating symmetric drive that is capable of elimination many or all of the listed drawbacks, i.e. in which the axial load acting on the freewheel is reduced to minimum, which have a favorable utilization of the axial space, which allows the fast removal and insertion of the rear wheel, that has a certain degree of self-adjusting properties, and last but not at least which allows rearward movement of the rear wheel.

These tasks have been solved by the wheel hub assembly designed as described in the attached claims.

The rear hub arrangement according to the present invention has a structural design which is simple compared to the complexity of the tasks imposed thereon, solves these tasks, the wheel can be easily removed and assembled, it has a minimum need for maintenance, and the closed inner design protects the sensitive elements from unwanted environmental effects.

The wheel hub arrangement according to the invention will now be described in connection with preferable embodiments thereof, wherein reference will be made to the accompanying drawings. In the drawing.

Figure 1:
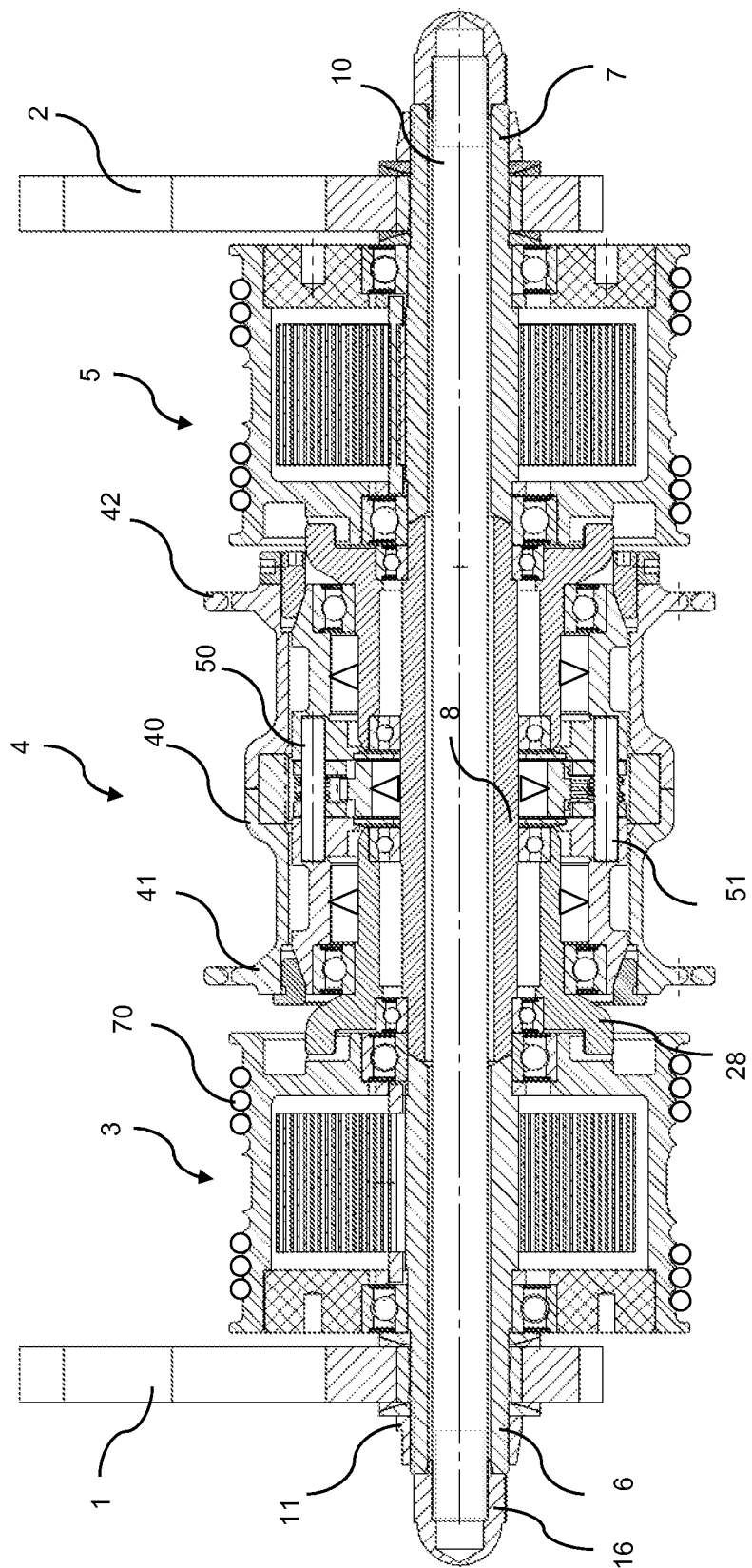
FIG. 1 shows the elevation sectional view of the wheel hub arrangement.

FIG. 1 shows the sectional elevation view of the whole wheel hub assembly which can be fixed in respective bores provided in the end regions of left fork arm 1 and right fork arm 2 of the rear fork of the frame of the bicycle (not shown in FIG. 1). The wheel hub assembly comprises three separate parts, i.e. left drum unit 3, wheel hub 4 and right drum unit 5. The two drum units 3 and 5 are arranged symmetrically to the central transversal plane of the assembly, they have identical designs and straddle the wheel hub 4 in a releasable way placed between them, wherein the wheel hub 4 is also symmetric to this central plane.

Three tubular shafts namely left tubular shaft 6, right tubular shaft 7 and central tubular shaft 8 are led through the central part of the assembly, said tubular shaft being associated with the respective ones of the aforementioned three parts of the assembly and in the assembled state of the wheel hub assembly these tubular shaft constitute together a single stiff tubular shaft 9 that acts as if the assembly had a single tubular shaft. A fixing shaft 10 is lead through the central hole of the tubular shaft 9 that has a diameter smaller than that of the inner hole of the shaft 9, and the fixing shaft 10 is the longest part of the assembly. As mentioned, the diameter of the fixing shaft 10 is smaller than that of the tubular shaft 9 to the extent, that when it is in a fully released position when the fork arms 1 and 2 take a free wider position, the fixing shaft 10 can still be freely introduced and led through the central hole of the tubular shaft 9. In case the diameter of the fixing shaft 10 is chosen to be 8 mm, then even a 1 mm higher hole diameter of the tubular shaft 9 satisfies this condition of free introduction.

Figure 2:
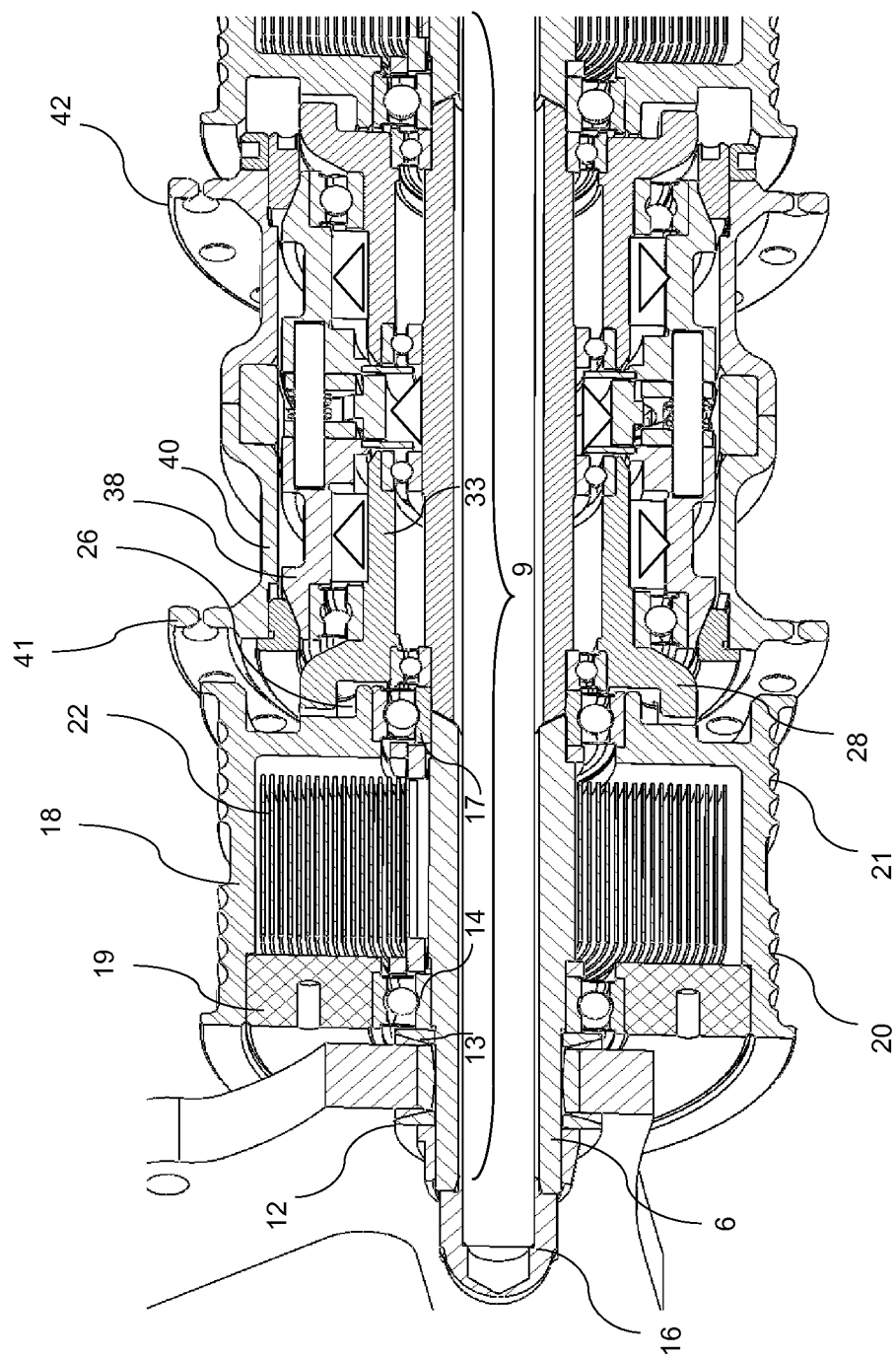
FIG. 2 is an enlarge detail of an elevation sectional view in perspective.

Reference is made now to FIG. 2 in connection of which the structure of the drum unit 3 will be described. A thread is provided on the outer end portion of the left tubular shaft 6 on which a drum-fixing nut 11 is arranged. The inner face of the nut 11 is pressed to a first positioning pair of washers 12 that have an internal surface pressed against the outer surface of the left fork arm 1. To the inner surface of this left fork arm 1 a second similar pair of positioning washers 13 is pressed, and this pair of washers 13 has an inner surface that is pressed to the inner ring of a first drum-holding ball bearing 14. The central face of this inner ring is supported by shoulder 15 provided on the left tubular shaft 6 (see FIG. 3). The fixing shaft 10 has threaded end sections of which the left end section extends longitudinally beyond the end of the left tubular shaft 6, and a standard wheel fixing nut 16 is threaded thereon. It is preferred if the outer shape of the drum fixing nut 11 is specially designed so that it can only be turned by a conforming special tool usable by a trained mechanic only. The fixing shaft 10 can equally be pressed by a skewer fixing assembly just as it is visible for fixing the front wheels of conventional bikes.

Figure 3:
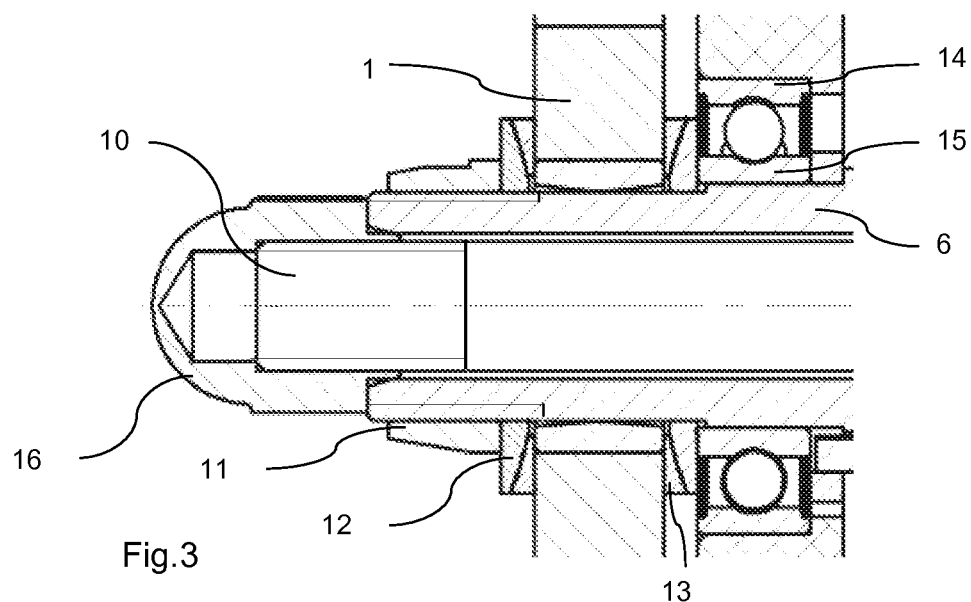
FIG. 3 is an enlarged sectional view that shows how the shaft is fixed to the frame.
Figure 4:
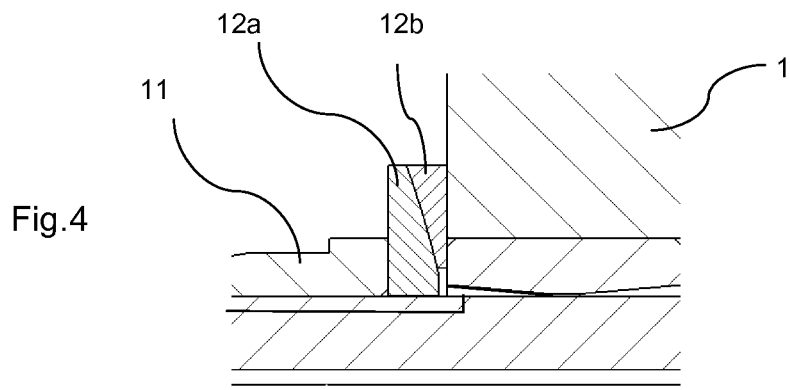
FIG. 4 shows an enlarged detail of FIG. 3.

FIG. 3 shows this part of the assembly in an enlarged view, and FIG. 4 shows the first positioning pair of washers 12 in a more enlarged view. The rear fork of the bicycle should preferably be made in such a way that initially (e.g. after its welding) the inner surfaces of the left fork arm 1 and right fork arm 2 in the areas including the wheel-holding bores be parallel with each other and with the vertical plane of the frame. Thereafter it is preferred if the lower ends of these fork arms are pushed away from each other by force so that a slight remaining deformation be provided, wherein the angle of divergence of these fork arms be in the range of 3-5°. In this position the wheel drum 4 can be removed from between the two drum units 3 and 5. Of course the required divergence of 3-5° can also be provided when the fork is welded.

As it is shown in FIG. 3, when the drum-fixing nut 11 is turned inwardly towards the stationary tubular shaft 6, then the inner face of the nut 11 presses together the positioning pair of washers 12, and the pulling force is transmitted through the fork arm 1 to the second positioning pair of washers 13, then to the inner ring of the drum-holding ball bearing 14, and the further axial displacement is prevented by the presence of the shoulder 15 to which the inner ring is abutting. By pulling the nut 11, the listed elements will be pressed to each other. In the enlarged view of FIG. 4 it can be seen that the positioning pair of washers 12 consist of two washers 12a and 12b of conforming convex-concave shapes arced as a cap, which can angularly slide relative to each other within an angle range of about of 3-5°, and a similar angular displacement is allowed by the inner positioning pair of washers. In any angular position the washers in the pair can engage and press each other with the applied high force.

The two positioning pairs of washers are required because initially the two fork arms 1 and 2 initially take a diverging position, and as the wheel-fixing shaft 10 is gradually pulled by turning the wheel-fixing nut 16 and the similar nut at the other side, the two fork arms 1 and 2 move towards each other and take their ideal (parallel) angular position when the nuts are fully pulled. The final pulling of the drum-fixing nut 11 takes place only after the pulled position of the wheel-fixing nut 16, whereas during the pressing of the fork arms together the then slightly loose nut 11 allows that slight changing of the angle between the face of the tubular shaft 6 and the inner wall of the fork arm 1. When the wheel-fixing movement forces the fork arms 1, 2 to take their final positions, the tubular shaft 6 (and the other two tubular shafts forming a solid body therewith) will take an optimum position. The drum-fixing nut 11 and the corresponding nut at the other side of the frame should be fastened under these conditions, whereby the tubular arm 6 will be fixed and pressed to the associated fork arm 1 and then it fixes the position of the drum unit 3. Thereafter the wheel-fixing nut 16 can be released, and if the nut 16 is fully removed, the rear wheel can be fully removed after the wheel-fixing shaft 10 has been fully pulled out. When the nut 16 is released, the angular position of the fork arms will change and a diverging position is taken, however, when the wheel-fixing shaft is inserted and pulled again, the fork arms 1 and 2 will take again the previously adjusted optimum angular position. This is the reason why the drum-fixing nut 11 should be provided with a special profile that can be adjusted by a trained service person only.

Reference is made again to FIG. 2 which shows that the inner ring of a second drum-holding ball bearing 17 is pulled on the other (inner) end of the tubular shaft 6 and this inner ring slightly extends over the end of the tubular shaft 6 in axial direction. The drum-holding ball bearings 14 and 17 are designed for a sufficiently high axial load. The outer ring of the second drum-holding ball bearing 17 holds left rope drum 18 which is a hollow bell-like element having several functional tasks. A distance disc 19 made of a plastic material is arranged between the open outer end of the rope drum 18 and the outer ring of the first drum-holding ball bearing 14 to close that open end.

The rope drum 18 is made preferably by an aluminum alloy and on its mantle surface at both sides respective rope paths 20, 21 are made as threaded grooves which receive flexible pulling element as rope 70 that drives the bicycle. The number of turns in the winding formed by the rope 70 is by about 1.5 to 3 higher than needed for being wound up and down when the bicycle is driven. These reserve turns are needed to provide an even distribution of the forces acting on the rope and for decreasing the load acting on the respective rope ends when fixed to the rope drum. It is preferred if the rope paths 20, 21 are made in such a way that the rope ends are fixed at the respective sides of the rope drum 18 and the rope is wound from the central region towards the sides. During operation the rope is periodically wound up and down at this central region, and the movement of the rope is the same at both sides of the rope drum, however the winding down occurs at the rope path 20 from right to left and at the rope path 21 from left to right (the winding up takes place in reverse directions), i.e. the two winding paths are oppositely wound. At both sides of the rope drum 18 respective upwardly directed rims are provided which have rounded upper ends which keep the rope on the mantle surface of the rope drum 18. The rope ends are fixed at respective cuts made in the rims (not shown).

The hollow interior space of the rope drum 18 serves for the location of rope-biasing spring 22 that is used to pull back the swinging elements of the driving system and to provide for the appropriate biasing of the rope itself. The rope-biasing spring 22 is a coil spring made by winding a stripe of an appropriate spring material with high number of turns, and the end of its innermost turn fixed to the tubular shaft 6 and its outer end is attached to the central part of the rope drum 18 between the two rope paths 20, 21. The sense of the winding of the coil spring 22 is such that the biasing force always tends to turn the rope drum 18 in backward direction i.e. opposite to the direction of the driving motion.

Figure 5:
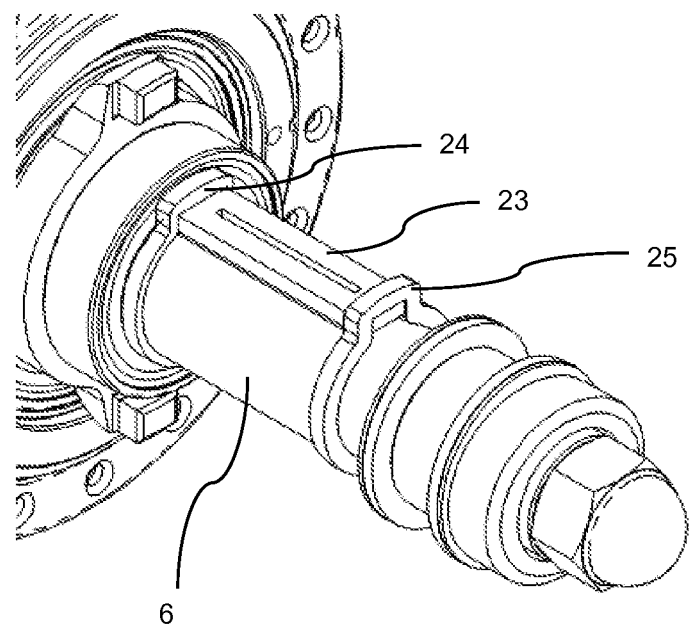
FIG. 5 shows how the drum spring is fixed on the tubular shaft, wherein the figure is shown by removed rope drum and spring.

An embodiment how the rope-biasing spring 22 can be fixed in the hollow interior of the rope drum 18 is shown in FIG. 5, that shows the assembly as if the spring 22 and the rope drum 18 were invisible. On the outer surface of the tubular shaft 6 a flat surface is provided in a width corresponding to the width of the hollow interior of the rope drum 18 on which a narrow rectangular plate 23 can be placed, and the plate 23 defines a longitudinally extending slot slightly wider than the width of the coil spring 22. The position of the plate 23 is releasable fixed by means of a pair of rings 24, 25 shaped to receive the plate 23. The inner end of the coil spring 22 comprises a bent portion that has a height corresponding to the thickness of the plate 23. When the spring 22 is placed on the tubular shaft 6, the plate 23 is positioned on its flat surface portion so that the bent inner end of the spring 22 is fitted in the slot of the plate 23. Thereafter the rings 24, 25 are pulled on the shaft to hold the plate 23 thereon. Thereafter the bell-like rope drum 18 can be positioned on its place, and the outer turn of the coil spring 22 is fixed to the central portion of the rope drum 18 by means of appropriate connection elements. The assembly can be assembled as shown in FIG. 2. The coil spring 22 can be biased after it has taken its described position and this step includes the rotation of the rope drum by several turns in forward direction. The correct direction can be indicated by an arrow placed on the central outer part of the rope drum 18.

The third function of the rope drum 18 is to transfer the torque generated by pulling the rope wound around the mantle surface thereof to the wheel hub 4. To this purpose on the inner face of the rope drum 18 that is directed towards the hub 4 a plurality of diametrically oppositely positioned pairs of nests 26 are provided which are angularly spaced from each other in an even angular distribution, wherein the number of the pairs can be between about 2 to 6. In assembled state pins 27, 28 are inserted in at least one of said pairs of nests, and the pins 27, 28 project laterally outward from both sides of the wheel hub 4. The section plane in FIG. 2 extends along the middle of such a pair of nests 26, therefore the figure does not show the sides thereof, however the recesses forming the nests 26 have slightly and outwardly expanding side walls to facilitate insertion of the pins 27, 28. In assembled position the main surface of the pins nicely fit in their corresponding nests, whereby the torque acting on the rope drum 18 is transmitted to the wheel hub 4.

The connection between the drum unit 3 and the wheel hub 4 is described with reference to the enlarged sectional view of FIG. 6. Close to the inner end of the tubular shaft 6 a second shoulder 29 is provided thereon, and a narrow distance ring 30 is pulled and fitted on the end of the shaft 6 abutting this inner shoulder 29 at one end and the inner ring of the second drum holding ball bearing 17. This inner ring extends over the inner end of the shaft 6 and receives the left end portion of the central tubular shaft 8 that faces towards the left drum unit 3. Such a design ensures that the axes of the tubular shafts 6 and 8 fall in the same line. A narrow gap is provided between the ends of the tubular shafts 6 and 8 for avoiding overdetermination and to enable a definite transmission of the axial forces between these shafts. The inner face of the inner ring of the ball bearing 17 abuts the outer face of the inner ring of the outermost ball bearing 31 of the wheel hub 4, and this inner ring has an inner face abuts shoulder 32 provided on the central tubular shaft 8.

In view of the fact that the whole structure is symmetric to the central plane, by describing the connection between the left tubular shaft 6 and the central tubular shaft 8, the design of the whole tubular shafts 6, 8 and 7 and the way how the shafts are fixed to the frame and to the rope drums have been shown, as the structure on the right side is the same as in the previously described left side. More particularly, if by fastening the left fixing nut 16 (and the other one on the right side) the two fork arms 1 and 2 are forced to move towards each other, then the axial force will be transmitted from the inner wall of the fork arm 1 through the positioning pair of washers 13 and the inner ring of the first drum holding ball bearing 14 to the tubular shaft 6. The tubular shaft 6 transfers this force through the inner ring of the second drum holding ball bearing 17 and the inner ring of the ball bearing 31 to the central tubular shaft 8, and in a similar was the force acting on the inner wall of the second fork arm 2 will be transmitted to the tubular shaft 8 from the other side. The fact that in the path of the axial forces the inner rings of the aforementioned ball bearings have been inserted, a very accurate and precise chain of force-transmission has been provided that ensures the required rigidity and this is more reliable as if the forces were transmitted directly between the neighboring tubular shafts. This is so, because the diameter of the connecting surfaces is higher, the faces of ball bearings are accurately tooled quenched surfaces, and these forces care at the same time also for the positioning of these ball bearings. Furthermore, the identical axes (with no radial play) of the tubular shafts is automatically ensured by fitting their ends in the same ring so that their end surfaces do not even contact each other. In this way the whole assembly will become a single rigid unit with the three tubular shafts, and the diameter and rigidity is much higher as if only a conventional central shaft 10 (with usually 8 mm diameter) was used, whereas this single body can be disassembled by loosening and removing the central shaft 10 into three separate parts. The nests 26 and the pins 27, 28 fitted therein serve only the transmission of torque and they are unable to transfer either axial or any other forces.

Figure 6:
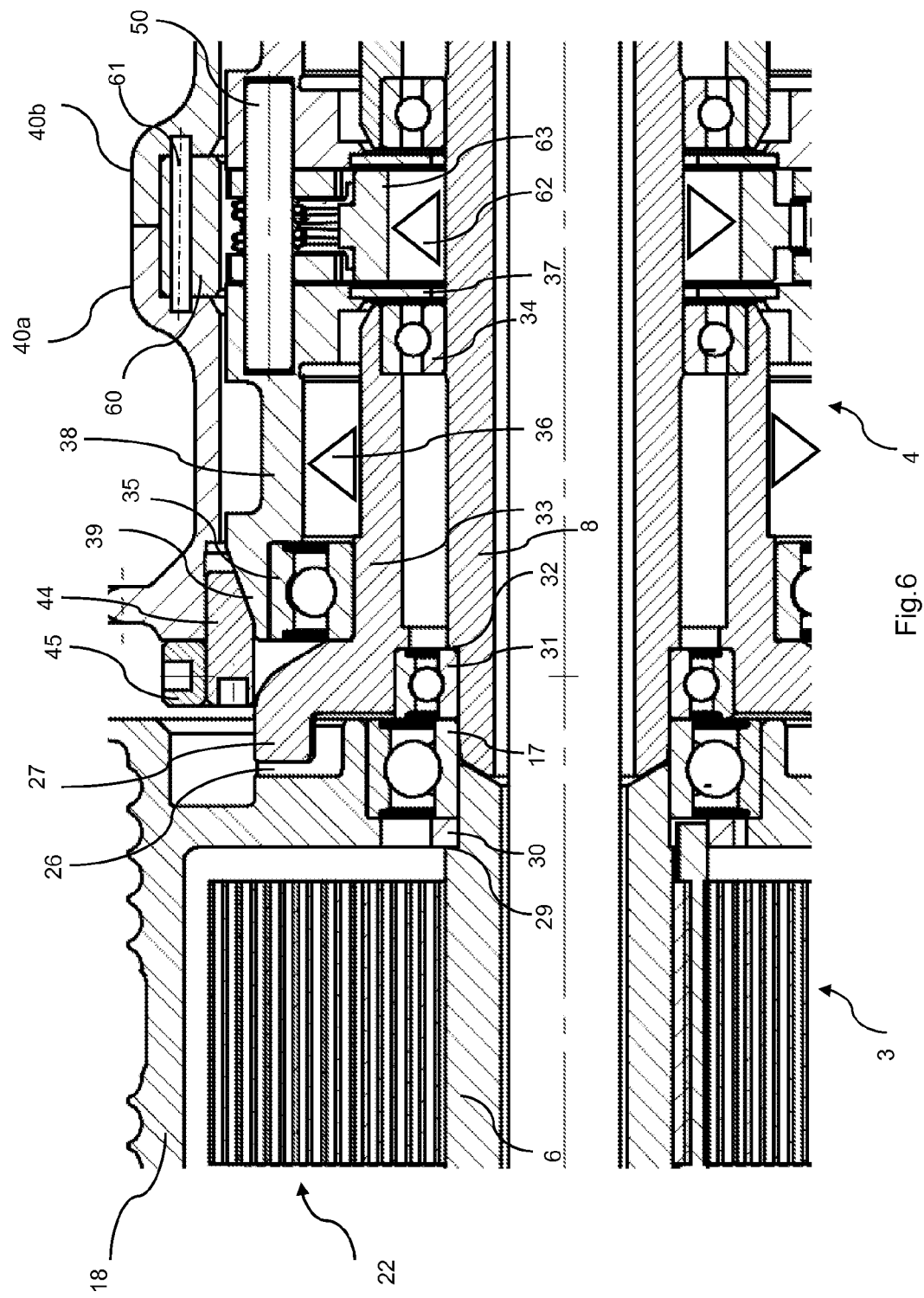
FIG. 6 is an enlarged detail of the sectional view of FIG. 1.

Reference will further be made to FIG. 6 that shows the driving pin 27 that forms an integral part of driving sleeve 33. In its left side the driving sleeve 33 is held by the ball bearing 31 on the central tubular shaft 8 that allows its free rotation and its inner end is connected to the central tubular shaft 8 by a further ball bearing 34. Inwardly from the pin 27 the driving sleeve has a cylindrical outer surface that has a section with slightly higher diameter which holds the inner ring of ball bearing 35 designed for high load. The cylindrical surface of the driving sleeve 33 past the inner ring of the ball bearing has a slightly smaller diameter and this outer surface constitutes the inner surface of a freewheel 36. The freewheel 36 consists of a plurality of profiled elements kept together by a ring-like spring forming a gird around them, and an intermediate sleeve 38 is placed around the profiled elements. Owing to their special design, the profiled elements allow free rotation of the inner and outer sleeves in one direction, and the elements get locked in the moment the two sleeves are moved in the other direction. In the sectional view of FIG. 6 the freewheel 36 is symbolized with a triangle. The cylindrical interior of the intermediate sleeve 38 around the freewheel 36 has a stepped design, The largest diameter is at its left side in which the outer ring of the ball bearing 35 is fitted, and this ball bearing 35 takes the majority of the radial forces acting on the intermediate sleeve 38. The second part has a slightly smaller diameter and this is the outer surface of the freewheel 36, then in central direction the interior of the intermediate sleeve 38 further decreases and its inner end extends inwardly over the inner end of the driving sleeve 33 and it has a narrow cylindrical end section, in which a distance ring 37 is fitted. The inner diameter of the distance ring 37 is higher than the outer diameter of the central tubular shaft 8, and a small gap is formed between the ring 37 and the end of the inner face of the ball bearing 34.

The outer end portion of the intermediate sleeve 38 has a conical section 39 that narrows down in outward direction i.e. towards the drum unit 3 which section 39 has the task of providing an axial support for the parts in the wheel hub 4.

In radial direction outside of the intermediate sleeve 38 an outer sleeve 40 is provided that consists of two half sleeves 40a and 40b fitted together in axial direction and the outer sleeve 40 is spaced from the sleeve 38 and they can be turned relative to each other. The outer sleeve 40 forms the outside of the wheel hub 4. Respective rims 41, 42 are provided at the two outer ends of the outer sleeve 40 (which can be seen in FIGS. 1 and 2), and a plurality of holes 43 (FIG. 2) are made around the rims 41, 42 to receive and hold the ends of the sprockets of the rear wheel. Respective inner threads are provided in the interior of the two lateral end regions of the sleeve 40 and as it can be seen in FIG. 6, a threaded support ring 44 is wound in the sleeve 40, the end of the support ring 44 facing towards the drum unit 3. The support ring 44 has a conical inner surface that form fits to the conical section 39 of the intermediate sleeve 38. When the support ring 44 is inserted, the two conical surfaces can turn around relative to each other, and the role of the support ring 44 is to provide a lateral positioning. In order to facilitate the relative rotation of these parts, an appropriate lubricant can be added between the two contacting conical surfaces. In the outward surface of the support ring 44 axial bores are provided, and by insertion an appropriate tool in the bores, the support ring 44 can be turned in and fastened with the required no too high force. A similarly designed further support ring is provided at the other (not illustrated) right end of the wheel hub 4. The left support ring shown in FIG. 6 has a slightly longer threaded outer end portion than that in the right side, and a threaded retainer ring 45 serves for locking the adjusted position of the assembly. The fastening of the retainer ring 45 occurs by means of axial bores made therein and an appropriate tool that can be fitted in these bores.

Figure 7:
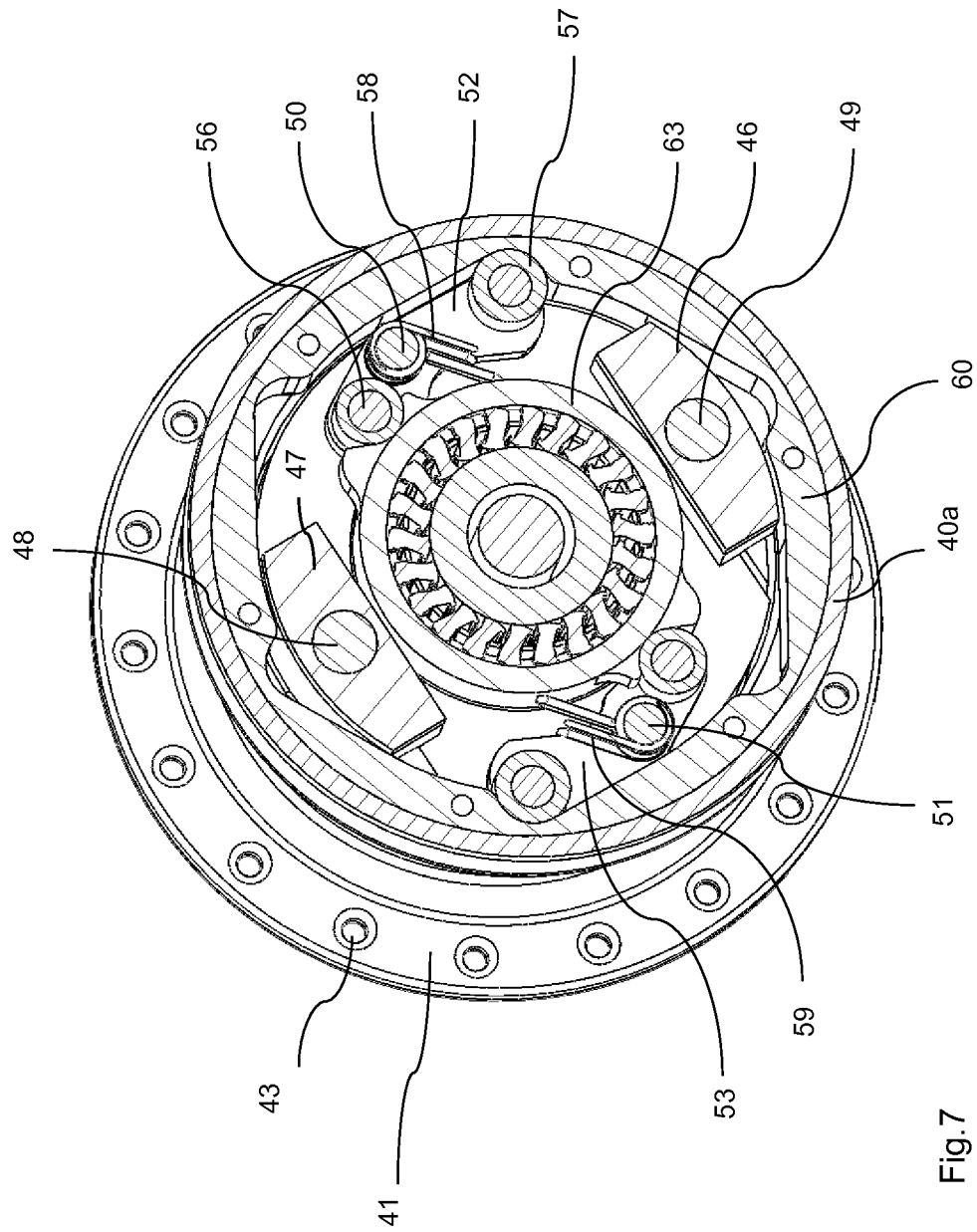
FIG. 7 shows the central section of the assembled rear wheel in perspective view.
Figure 10:
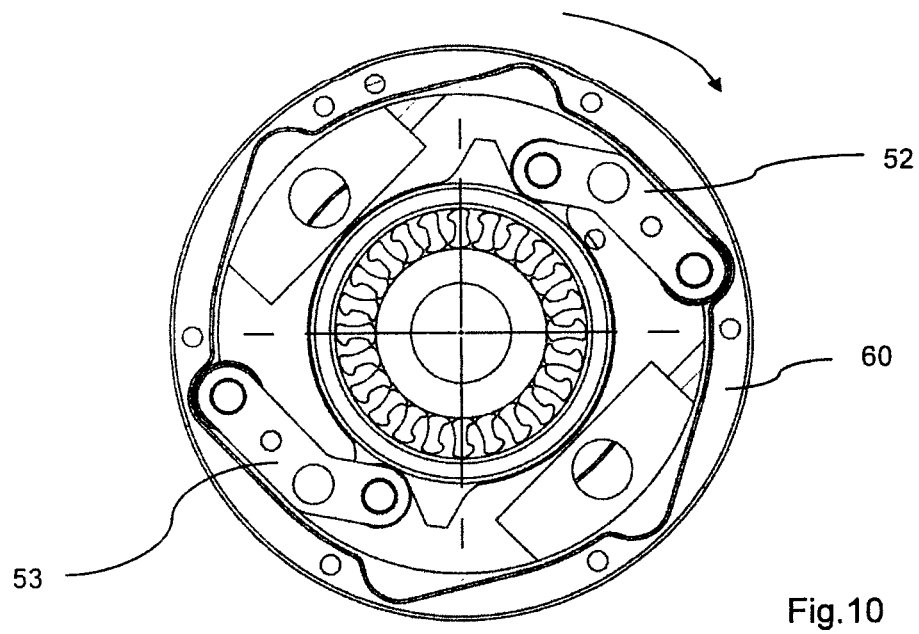
FIG. 10 shows a sketch similar to that of FIG. 7 that shows the assembly in normal driving position.
Figure 11:
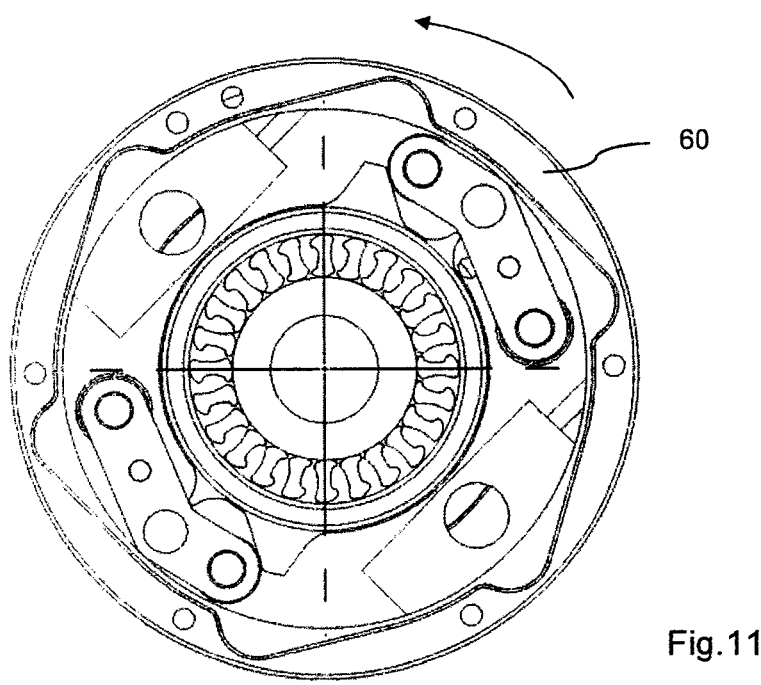
FIG. 11 is a sketch similar to FIG. 10 showing the assembly in a state when the rear wheel is turned in backward direction.

The inner end portion of the intermediate sleeve 38 has a specially designed form that can be seen in the perspective view of FIG. 7 and on the sketches of FIGS. 10 and 11. The portion of the inner part of the intermediate sleeve 38 extends till the central symmetry plane of the wheel hub 4, but from the face area a cavity is tooled by milling, and the remaining parts are formed by a pair of diametrically opposing support surfaces 46, 47 that have a substantially rectangular profile having arced outside profiles (as it can be seen in FIG. 7). In these support surfaces 46, 47 respective large axial bores 48, 49 are provided, and respective connection pins (not shown) are fitted in these bores. These connection pins connect the two opposite intermediate sleeves 38 together when the two halves of the wheel hub 4 are pushed together in axial direction so that they form a single mechanical unit. In the intermediate sleeve 38 substantially normal to the connection line of the axes of the bores 49 a further pair of axial bores are provided in which respective pins 50, 51 are fitted and these constitute support and axis of rotation for a pair of balancing levers 52, 53, furthermore the pins 50, 51 equally connect the two opposing intermediate sleeves 38. The pins 50, 51 can also be seen in FIG. 1 and the pin 50 can also be seen in the enlarged sectional view of FIG. 6.

Figure 8:
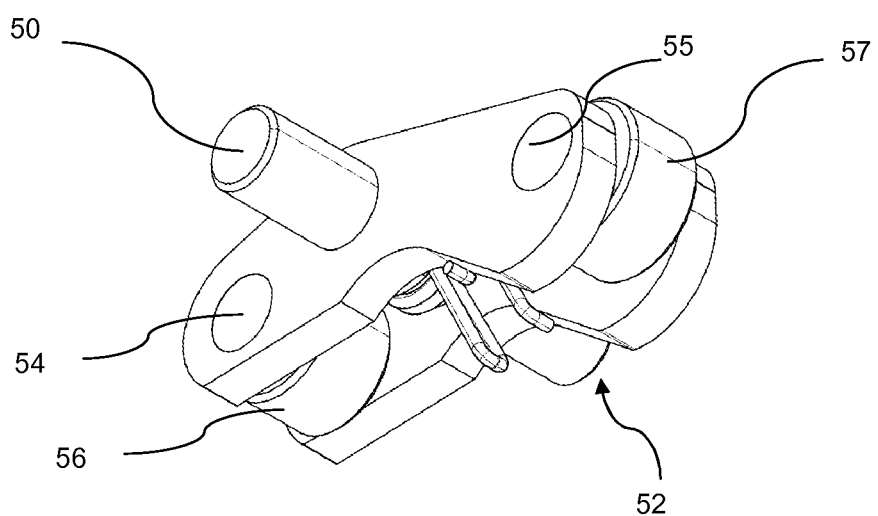
FIG. 8 shows the enlarged perspective view of a balancing lever.

The axonometric picture of the balancing lever 52 is shown in FIG. 8. The balancing lever 52 consists preferably of a plurality of profiled sheets interconnected by rivets not shown and it is basically a two-armed lever, and in the outer region of both arms respective roller shafts 54, 55 are fixed, and each of them holds a roller 56, 57 which are strong and can freely rotate around their shafts 54, 55. Respective rings 58, 59 (FIG. 7) are provided on the pins 50, 51 which press the associated balancing lever so that the outer roller 57 is biased in outward and the inner roller 56 in inward direction.

In FIG. 6 it can be seen that the central portions of the half sleeves 40a, 40b that together constitute the outer sleeve 40 extend out in radial direction and the define together a common radial cavity in which a locking ring 60 is arranged. The locking ring 60 has six axial bores through which pins 61 are extending through and the pins 60 extend in corresponding axial bores made in the half sleeves 40a, 40b to interconnect and fix the half sleeves 40a, 40b and the locking ring 60. The inner surface of the locking ring 60 has a plurality of arced nests in which the radius of the arc corresponds to the radius of the outer rollers 57.

Figure 9:
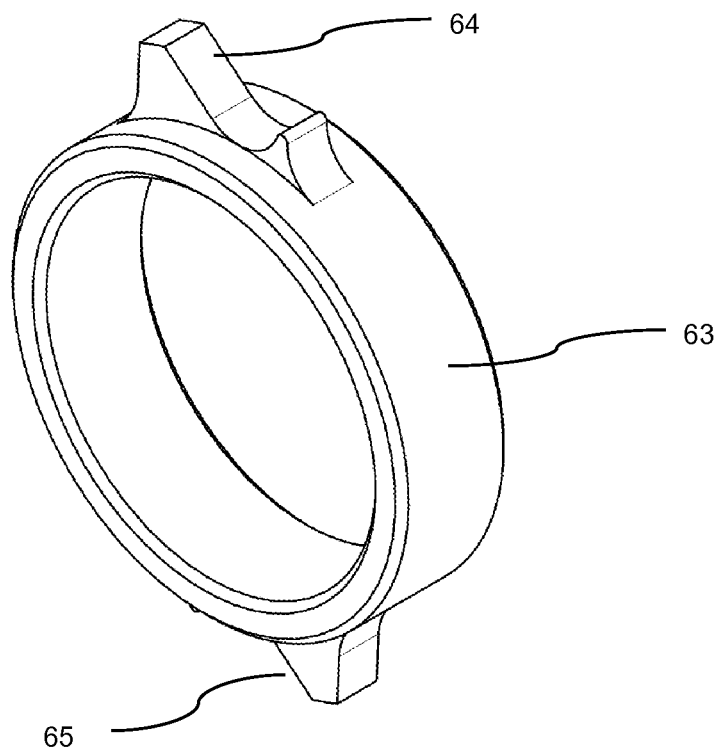
FIG. 9 shows the enlarged perspective view of a lift-off ring.

Reference is made again to FIG. 6, by describing the central portion of the wheel hub 4. Around the central tubular shaft 8 the distance ring 37 can be found. Between the distance ring 37 and the similar distance ring of the other half of the wheel hub a second freewheel 62 is arranged, and the inner support surface thereof is constituted by the central outer surface of the tubular shaft 8, and the outer part of the freewheel 62 is in contact with the inner surface of a lift-off ring 63. The shape of the lift-off ring 63 is shown in the perspective view of FIG. 9 in which one can see that the lift-off ring 63 has a substantially cylindrical outer surface of which a pair of diametrically opposing projections extend out and define respective lift-off nests 64, 65 with arced V-shaped profile that fits to the outer diameter of the inner rollers 56 of the balancing levers 52, 53. FIGS. 10 and 11 show the two possible stable positions of the structure.

The operation and use of the wheel hub arrangement according to the invention is as follows. If the wheel hub arrangement is assembled between the two rear fork arms 1 and 2 of the bicycle as described, the case will be examined first when the cyclists normally rides the bike and rotates the crank arms and pedals. In the symmetric alternating drive the driving rope always rotates at least one of the two drum units 3 or 5 in forward direction, but the angular speed is higher at one of the sides. The actual driving is provided always by the side which has the higher angular speed in forward direction.

Supposing this is just the left driving unit 3. The forward rotation of the rope drum 18 rotates the driving sleeve 33 in forward direction by means of the driving pins 27, 28 that are fitted in the corresponding nests 26 in the rope drum 18. The driving sleeve 33 is pivoted around the tubular shaft 8 and can freely rotate around it. In such a condition, i.e. when the forward angular speed of the inner surface of the freewheel 36 is higher than the angular speed of the wheel and of the outer sleeve 40 connected therewith, the freewheel 36 will be in locked position and the rotation is transmitted to the intermediate sleeve 38 surrounding the freewheel 36. With the intermediate sleeve 38 the two balancing levers 52, 53 shown in FIGS. 7 and 8 are in rigid connection. The balancing levers 52, 53 are kept by the springs 58, 59 in the position shown in FIGS. 7 and 10. The outer rollers 57 of the balancing levers 52, 53 get engaged in the inner nests of the locking ring 60 and when pressing the nests, they rotate the locking ring 60 and together with it the outer sleeve 40 with the rear wheel in forward direction. This driving operation corresponds to the normal use of the bicycle, i.e. the driving sleeve 33 rotates together with the intermediate sleeve 38 and with the wheel.

In case when the forward angular speed of the right drum unit 5 will be higher than that of the drum unit 3 at the left side, then the freewheel on the right side will force the intermediate sleeve 38 (the two sleeves 38 are rigidly connected) to similarly rotate with this higher angular speed. The freewheel 36 at the left side is in open state when the intermediate sleeve 38 rotates faster than the driving sleeve 33, therefore in the left side the winding up of the rope at the left side can happen without any problem.

Let us suppose that the biker rolls down on a slope and he is not driving the pedals at all. In such case the forward angular speed of the wheel is higher than that of the driving sleeve at any of the two sides, this rotation is allowed by the now open freewheels, and the outer sleeve 40 and the two connected intermediate sleeves 38 rotate together.

It should be noted, that during the forward rotation of the intermediate sleeve 38 the inner rollers 56 of the balancing levers 52, 53 engage in the lift-off nests 64, 65 of the lift-off ring 63 and rotate this lift-off ring 63 with them. The second freewheel 62 arranged in the central part of the hub does not prevent such a rotation.

These conditions will change when the bike is pushed in backward direction and the rear wheel tries to rotate backward. Such a situation is shown in FIG. 11. At such a rotation the second freewheel will have a role, as it does not allow rearward rotation relative to the stationary central tubular shaft 8, it gets locked and stops rotation of the lift-off ring 63 which is forced to move backwards through the balancing levers by the rear wheel. The rearward force which is transmitted by the inner roller 56 towards the lift-off nests 64, 65 of the lift-off ring 63 will have the consequence that this force moves the roller 56 in radially outward direction along the rear slopes of the lift-off nests 64, 65 against the biasing force of the springs 58, 59. As a result, the outer rollers 57 of the balancing levers 52, 53 move inwardly and get disengaged from the nests of the locking ring 60 to take the position shown in FIG. 11, whereby the locking ring 60, the outer sleeve 40 and the rear wheel become disengaged and independent from the movement of the intermediate sleeve 38. Now the rear wheel can freely rotate in backward direction. The rotation in rearward direction will be slightly braked by the friction forces between the conical section 39 of the intermediate sleeve 38 and the form fitting conical surface of the support ring 44 pressed thereto, however, this braking effect is insignificant. It should be noted that the rearward rotation of the intermediate sleeve 38 would also be prevented by one of the freewheels 36, however, this would slightly turn with it the rope drum connected therewith, but the resilience of the rope is sufficiently high to allow a slight rearward movement of the intermediate sleeve 38, allowing the second freewheel 62 to get locked and to allow disengagement of the balancing levers from the locking ring 60 as described.

In the moment that the backward movement of the rear wheel terminates, the originally described conditions will prevail again, and under the biasing effect of the springs 58, 59 the balancing levers 52, 53 will connect the rollers 57 again with the locking ring 60.

During normal driving, when the highest loads take place, the outer sleeve 40, the intermediate sleeve 38 and the support ring 44 rotate together, the radial load will be transmitted through the described support ways to the central hollow shaft 8, and the assembly forms a rigid loadable mechanical unit.

The release of the wheel hub 4 is very simple, to this end only the outermost wheel fixing nuts 16 have to be released and the fixing shaft 10 has to be pulled out. The resilience of the rear fork arms will then move the two rope drum units 3, 5 in axially outward direction, and the driving pins 27, 28 will get released from their associated nests, whereby the rear wheel can be removed. The assembly of the rear wheel takes place in reverse order. Because the freewheels slightly prevent the rear movement of the wheel, for the engagement (fitting) of the pins 27, 28 in their associated nests it is sufficient to move the heel slightly in rear direction when the pins 27, 28 will also move and can easily find the position, where they will fit into their nests. When the wheel fixing nuts 16 will be fastened, the assembly takes its originally adjusted stiff position having the same axis.

In case the biker is satisfied that the bike can be moved only in forward direction, the structural design of the wheel hub 40 can be much simpler, and there will be no need for using the second freewheel 62, the lift-off ring 63, the locking ring 60, and the intermediate sleeve 38 can be connected directly to the outer sleeve 40.

The fact that the biasing springs were arranged in the interior of the rope drum units and these rope drum units were releasable connected to the wheel hub, the easy removal of the rear wheel has been resolved without the need of touching the driving ropes. In chain-driven bicycles the removal of the rear wheel is an unpleasant and dirty task. A further advantages comes from the use of three units closed from the outside that sufficiently prevents the inner parts from environmental effects (e.g. dust, contamination, humidity and corrosion). The symmetrical design of the rear hub is preferable which can be assembled and disassembled from two half units, the respective halves are pressed together by the axial component of the biasing forces of the sprockets, but these halves can also be fitted by means of using appropriate adhesives, that can be released if there is a need for reparatory works.

The components described are mostly standard elements that can be obtained from normal commercial sources, and the freewheels can be realized by the freewheel clutches type FE 400 Z or FE 800 Z of the Company GMN Paul Müller Industrie GmBh & Co. KG (Nuernberg, Germany).

The rear hub assembly is ideal for use in alternating drives with swinging arms, in which the exertion of the driving force can be provided either by human power or by means of appropriate motor drives. It is a substantial advantage that in the interior of the rope drum sufficient space is provided for arranging the spring that ensures pulling back and biasing the pulling elements of the drive, whereas the width of the spring will not increase the total width of the assembly, because the lateral size of the rope drums is higher than the width required for the pulling elements.

While the present invention has been described in connection with being used in the rear hub of normal bicycles, the applications of the present invention are not limited to bicycles, but it can be used in each case where there is a sense for using an alternating drive, e.g. in tricycles, recumbent bikes, or light vehicles driven by electric motors or engines (e.g. scooters, special small vehicles).

The solution according to the invention can be realized in numerous other ways as shown by way of example, therefore the scope of protection cannot be limited to any one of the exemplary embodiments shown.

The invention claimed is:

1. Wheel hub arrangement for a wheel driven by an alternating symmetric drive system having an alternating driving operation using a flexible pulling element used in vehicles, which is connected to frame parts of the vehicle in a releasable way that hold the wheel, comprising:
   a first drum unit (3),
   a wheel hub unit (4)
   a second drum unit (5);
said units are arranged axially side-by-side along a common wheel axis and define a central axial bore;
   a fixing shaft (10) lead through said central bore and being connected to said frame parts in a releasable manner, said drum units (3, 5) each comprise:
   a hollow drum (18) having an outer surface,
   a winding of said flexible pulling element fixed to said hollow drum (18), wherein during said alternating driving operation said flexible pulling element being wound up and down,
   said wheel hub unit (4) comprises an outer sleeve (40) being pivoted for rotation around said wheel axis, said outer sleeve (40) comprises connection parts that can be connected to elements supporting and holding said wheel, and the arrangement comprises respective freewheels of first type close to each side of said hub unit, and when said hollow drums being rotated in the driving direction said freewheels allow rotation of said sleeve (40) with the drum that momentarily has a higher angular speed than the other drum, whereas said freewheels allow the wheel to freely rotate in forward direction when the speed of the wheel is higher than the angular speed of any of the drums, characterized in, that said wheel hub unit (4) comprises:
   a stationary central tubular shaft (9) around said fixing shaft (10), a pair of driving sleeves (33) pivoted for rotation around said stationary tubular shaft (9), said driving sleeves being spaced from each other in axial direction, have respective side surfaces facing towards an associated one of said drum units (3, 5) and being connected to the associated drum unit (3 or 5) so that said connection being capable of transmitting torque only;
   respective intermediate sleeves (38) surrounding an associated one of said driving sleeves (33) and being spaced therefrom in radial direction to form a ring-like space;
   respective ball bearings (35); wherein said ball bearings (35) and said freewheels (36) being arranged in the ring-like space formed between said driving sleeves (33) and the associated intermediate sleeves (38), both said ball bearings (35) and said freewheels (36) have inner and outer surfaces and being designed in such a way, that their inner surfaces are fitted to outer surface of the associated driving sleeve (33) and outer surfaces fitted to inner surfaces of the associated intermediate sleeve (38), and said intermediate sleeves (38) are rigidly interconnected and at least when the wheel being driven are also rigidly connected to said outer sleeve (40).

2. The wheel hub arrangement as claimed in claim 1, wherein said central tubular shaft (9) comprises tubular shafts (6,7,8) arranged respectively in a side-by-side relationship in the interior of said first drum unit (3), said wheel hub (4) and said second drum unit (5), said tubular shafts (6,7,8) are pressed together in axial direction to constitute thereby said central tubular shaft (9) as a single rigid shaft, said tubular shafts (6, 7) in said first and second drum units (3, 5) both have threaded outer end portions, respective drum-fixing nuts (11) and positioning pairs of washers (12, 13) are fitted on said threaded end portions to fasten said drum units (3, 5) to the associated frame part so that said washers (12, 13) allow a predetermined small angular difference between the normal direction to said frame part and the axis of the tubular shaft fastened thereto, and respective wheel fixing nuts (16) are fastened on the two ends of said fixing shaft (10) said wheel fixing nuts (16) being pressed against the outer surface of an associated one of said drum-fixing nuts (11).

3. The wheel hub arrangement as claimed in claim 2, characterized by comprising a first ball bearing (14) fitted on said tubular shaft (6 or 7) at a first side of said associated drum unit (3 or 5) facing towards said frame part and a second ball bearing (17) placed also on said tubular shaft (6 or 7) at the other side of said associated drum unit (3 or 5) that faces towards the wheel hub (4), said first and second ball bearings (14, 17) fixing said associated drum unit (3 or 5) and said tubular shaft (6 or 7) for rotational movement; said tubular shaft (6 or 7) comprises a shoulder (15) for supporting and axially fixing an inner ring of said first ball bearing (14), said second ball bearing (17) has an inner ring that axially extends over the inner side of said tubular shaft (6 or 7), and an end portion of the central tubular shaft (8) is also fitted in the interior of said inner ring of said second ball bearing (17) so that the ends of said tubular shaft (6 or 7) and of said central tubular shaft (8) being spaced from each other, whereby said inner ring ensures that the axes of said tubular shafts (6 or 7, and 8) fall in the same line, and said central tubular shaft (8) comprising a shoulder that abuts said inner ring directly or through the inner ring of the ball bearing (31) that holds said driving sleeve (33).

4. The wheel hub arrangement as claimed in claim 2, characterized in that said positioning pairs of washers (12, 13) each comprise a first washer with a concave cap surface and a second washer with a conforming concave cap surface allowing a limited degree of relative angular displacement between said washers.

5. The wheel hub arrangement as claimed in any of claims 1 to 4, characterized by having a symmetric design relative to a central plane normal to the central axis.

6. The wheel hub arrangement as claimed in claim 1, wherein each of said drum units (3, 5) comprises a respective rope drum (18), said rope drums (18) have a hollow interior and an inner side wall, and being coaxially arranged around the axis of said fixing shaft (10); and respective springs (22) wound by a strip material and arranged in the hollow interior of an associated one of said rope drums (18) and having an inner end connected to the stationary tubular shaft (9; or 6,7) and an outer end connected to said associated rope drum (18), wherein said spring (22) biasing said rope drum (18) opposite to the direction of driving.

7. The wheel hub arrangement as claimed in claim 6, characterized in that each of said rope drums (18) has a side facing towards said wheel hub (4) and a plurality of recesses arranged in even angular distribution are provided in said side; axially projecting driving pins (27, 28) extend out of said side surfaces of said driving sleeves (33), said connection between the driving sleeves (33) and the associated one of said drum units (3, 5) being provided by the engagement of said driving pins (27, 28) in said recesses; said recesses being spaced and designed so that a respective one of said axially projecting driving pins (27, 28) of said driving sleeve (33) can be inserted therein, and the number of said recesses is equal to the number of said driving pins (27, 28), or to the multiple of this number constituting thereby said connection which is capable of transmitting torque only.

8. The wheel hub arrangement as claimed in claim 1, characterized by comprising a second type of freewheel (36) different from said first type freewheels for allowing the rearward rotation of the wheel, said second freewheel (36) has respective inner and outer surfaces and being arranged around the central shaft (9) in a central section thereof defined between the two driving sleeves (33) and between the two intermediate sleeves (38); and a lift-off ring (63) arranged around the outer surface of the second freewheel (36), the outer surface of the lift-off ring (63) defines at least one lift-off nest (64, 65) having a sloping side wall; furthermore an axial gap is provided between the two intermediate sleeves (38) and at least one axial pin (50, 51) fixed to both of said intermediate sleeves (38) and bridging said gap, a double armed balancing lever (52, 53) is fixed to and pivoted around said axial pin (50, 51) to take a pivotal movement, respective outer and inner rollers (57, 56) are provided and pivotally coupled to respective end sections of said balancing lever (52, 53); said outer sleeve (40) has a radially projecting central section, a locking ring (60) is arranged in and fixed to the interior of this radially projecting central section of the outer sleeve (40), said locking ring (60) defines a profiled hollow interior arranged around said outer roller (57) and has locking nests one of which engages and locks said outer roller (57) in an outermost position in said pivotal movement of said balancing lever (50, 51); a spring (58, 59) is adapted to press said balancing lever (52, 53) to take said outermost position, said inner roller (56) pivoted on the other arm of said balancing lever (50, 51) is fitted in said lift-off nest (64, 65) of said lift-off ring (63), and when said wheel is turned in backward direction, said second freewheel (36) is forced to take its locked position and prevents rearward rotation of said lift-off ring (63), and the outer sleeve (40) and the intermediate sleeves (38) connected to the outer sleeve (40) are also turned in rearward direction moving said balancing lever (52, 53) in rearward direction against the pressure of said spring (58, 59), whereby said balancing lever (52, 53) moves out of said outermost position and forces said inner roller (56) to roll along said sloping side wall of said lift-off nest to take another extreme position, in which said outer roller (57) gets disengaged from said locking nest and this releases the connection between said outer sleeve (40) and said intermediate sleeves (38) allowing free rearward rotation of the outer sleeve (40) and of the wheel.

9. The wheel hub arrangement as claimed in claim 8, characterized by comprising a pair of said balancing levers (52, 53) arranged in diametrically opposite position with respect to each other, said lift-off ring (63) has two oppositely positioned lift-off nests (64, 65), and said locking ring (60) has a plurality of locking nests the number of which equals to the multiples of two and the locking nests arranged evenly around the inner perimeter of said locking ring (60).

10. The wheel hub arrangement as claimed in claim 1, characterized in that said intermediate sleeves (38) have outer side regions at which respective conical sections (39) are provided, and in the respective sides of said outer sleeve (40) respective internal threads are provided, respective support rings (44) are threaded in said internal threads provided with conical end regions with surfaces conforming to and abutting conical surfaces of said conical sections (39), and said support rings (44) being driven in into an adjusted position until a predetermined abutment force is sensed between the conforming conical surfaces that allow relative rotational movement between these abutting surfaces, and at least one of said support rings (44) has an outer end section extending out in axial direction from said side of said outer sleeve (40), said end section is provided with an outer thread, and a retainer ring (45) is mounted on this end section to secure the adjusted position of said support rings (44).

\* \* \* \* \*